United States Patent [19]

Abramson

[11] 4,078,288

[45] Mar. 14, 1978

[54] METHOD FOR FABRICATING A DOOR

[76] Inventor: Harold B. Abramson, 30 Stearns Rd., Brookline, Mass. 02146

[21] Appl. No.: 657,166

[22] Filed: Feb. 11, 1976

[51] Int. Cl.2 .............................................. B23P 17/00

[52] U.S. Cl. ........................... 29/155 R; 29/DIG. 47; 29/407; 29/526 R; 52/455

[58] Field of Search ............ 29/155 R, 526, DIG. 47, 29/407; 83/54; 52/455

[56] References Cited

U.S. PATENT DOCUMENTS

| | | | |
|---|---|---|---|
| 2,706,543 | 4/1955 | Kammerer | 52/455 X |
| 2,889,899 | 6/1959 | Bianco | 52/455 X |
| 3,284,976 | 11/1966 | Kadish | 52/455 |

*Primary Examiner*—Charlie T. Moon

*Attorney, Agent, or Firm*—Altman, Oates & Bello Morse

[57] ABSTRACT

An entrance door with a plurality of extruded sections that are interconnected to form a rectangular frame, a glass panel mounted within the frame. The door is partially fabricated by punching openings at specified locations on the extruded sections. The openings are punched in a press that is provided with guideways and stops for positioning the extruded sections in alignment with a punching tool. The punched openings are configured to receive a lock mechanism and hinge hardware as well as tie rods that are used for interconnecting the sections.

11 Claims, 31 Drawing Figures

METHOD FOR FABRICATING A DOOR

BACKGROUND OF THE INVENTION

1. Field of Invention

The present invention relates to entrance doors and more particularly is directed a method and apparatus for fabricating entrance doors having interconnected extruded sections.

2. Description of the Prior Art

Entrance doors of various configurations have been fabricated from a plurality of precut extruded sections that are welded together to form a rigid structure. Openings are drilled and milled in the extruded sections to make provisions for lock mechanisms and hinge hardware. Since the drilling and milling operations require the services of skilled mechanics in order to ensure proper mating with door frames, such entrance doors have suffered from the disadvantages of complex and costly fabrication techniques. Also, due to the rigid construction of such entrance doors, shims are used to adjust the door frame opening for proper alignment with the door.

SUMMARY OF THE INVENTION

It is an object of the present invention to provide a method and apparatus for fabricating an adjustable entrance door that does not require the services of a skilled mechanic. The entrance door is characterized by a plurality of extruded sections that are interconnected to form a rectangular frame in which a glass panel is mounted. The extruded sections include a lead edge stile, a hinge stile, a top rail and a bottom rail. The door is partially formed by punching openings at specific locations on certain ones of the extruded sections. The openings are punched in a press having guideways and stops for positioning the extruded sections in alignment with a punching tool. A tie rod extends through each rail and into punched openings in the stiles for interconnecting the sections to form the rectangular frame. Punched openings in the lead edge stile are provided for a lock mechanism and punched openings are formed in the hinge stile to accomodate hinge hardware. The top rail is fitted with a block that extends through a punched opening therein for engagement with the glass panel for relative movement of the lead edge stile and hinge stile. An adjustable member, which is captively held to the bottom rail, extends into punched openings in the lead edge stile and hinge stile. The adjustable member extends the width of the door and is vertically movable relative to the bottom rail for mating alignment with a threshold.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompany drawings, wherein:

FIGS. 19A and 19B illustrate the steps in punching the aperture of FIG. 18;

DETAILED DESCRIPTION OF THE PREFERRED EMBODIMENTS

Figure 1:
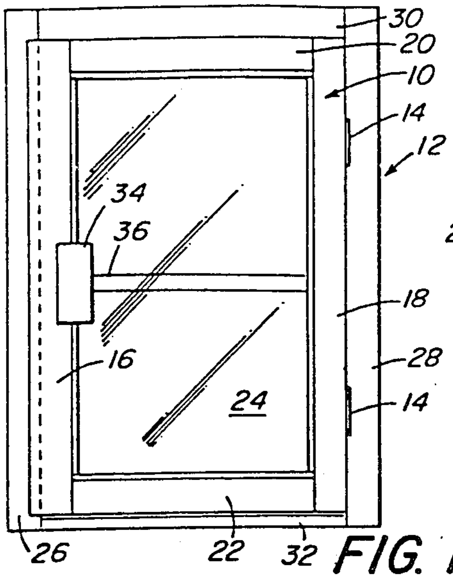
FIG. 1 is a front elevation of an entrance door embodying the invention.

Referring now to the drawings, particularly FIG. 1, there is shown an outwardly opening entrance door 10 which is hung on a door frame 12 by means of hinges 14, for example butt hinges. Door 10 comprises a plurality of sections that are extruded and cut to predetermined lengths. The extruded sections include a lead edge stile 16, a hinge stile 18, a top rail 20 and a bottom rail 22 which are interconnected to form a substantially rectangular frame in which a panel 24, for example a glass panel, is captively held. Door frame 12 comprises a plurality of sections that are extruded and cut to predetermined lengths. The extruded sections include side jambs 26, 28, a header 30 and a threshold 32 which are interconnected to form a substantially rectangular open frame. In the following description, the sides of each extruded section of door 10 are denoted as inner, outer, interior and exterior. The inner sides of the extruded sections face one another, glass panel 24 being in juxtaposition with the inner sides. The outer sides are opposite the inner sides. The exterior sides of the extruded section are on the outside of the door and the interior sides are on the inside of the door opposite the exterior sides. The extruded sections of door 10 and frame 12 are composed of an aluminum alloy having a hard, highly resistant thermoset coating. Preferably, the extruded sections are composed of an aluminum alloy consisting essentially of approximately 0.4 percent silicon, 0.7 percent magnesium and 98.9 percent aluminum and having an aluminum Associated alloy designation 6063-T5 as specified in the Aluminum Association Standardized System of Alloy Designation adopted October, 1954. The nominal thickness of each extruded section is approximately 3.2 mm (0.125 inches). The thermoset coating is an acrylic resin with amide side chains copolymerized from styrene and ethyl acrylate.

Figure 2:
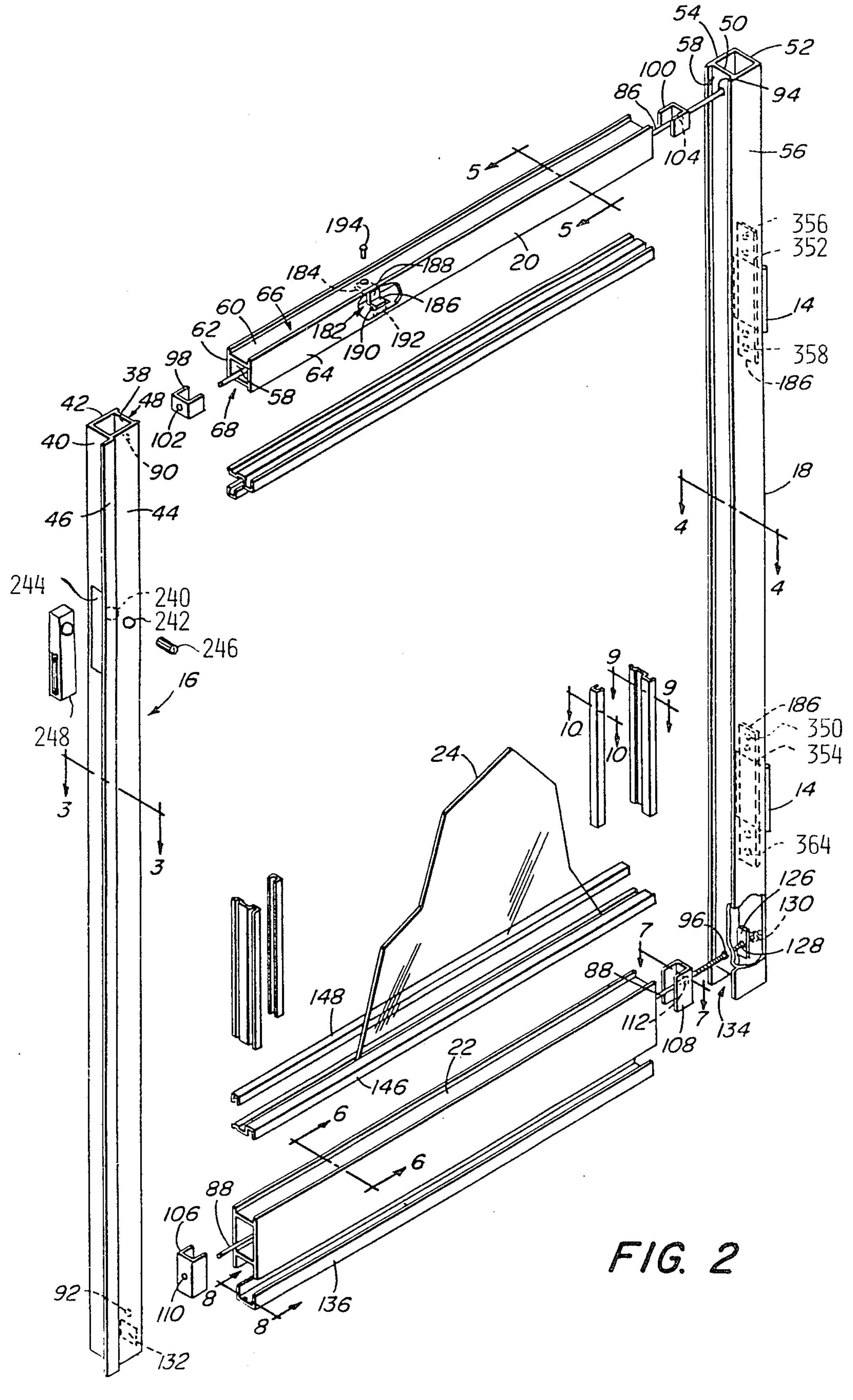
FIG. 2 is an exploded view in perspective of the entrance door of FIG. 1.

In the embodiment of FIG. 1, hinges 14 are mounted to hinge stile 18 and side jamb 28 in such a way that door 10 swings outwardly. A pull handle 34 is fastened to the exterior side of lead edge stile 16. A push bar 36 is mounted between lead edge stile 16 and hinge stile 18 on the interior face thereof. A lock mechanism 248 is mounted to lead edge stile 16. The detail construction of entrance door 10 is shown in FIG. 2. The cross sectional profiles of lead edge stile 16, hinge stile 18, top rail 20 and bottom rail 22 are shown in FIGS. 3, 4, 5 and 6 respectively.

Figure 3:
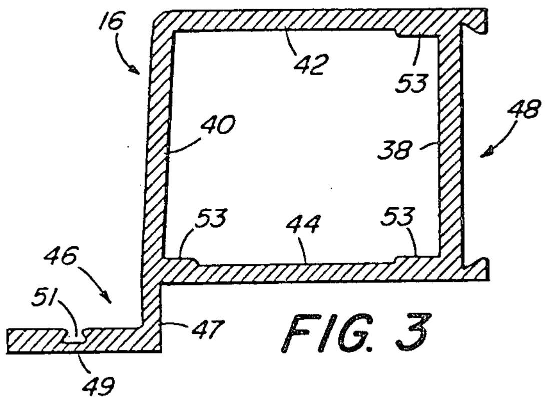
FIG. 3 is a sectional view of the lead edge stile taken along the lines 3—3 of FIG. 2.

Referring now to FIGS. 2 and 3, it will be seen that lead edge stile 16 comprises an inner side 38, an outer side 40, an interior side 42, an exterior side 44 and an extending flange 46. Inner side 38, outer side 40, interior side 42 and exterior side 44 have a generally trapezoidal profile in right cross section. Interior side 42 and exterior side 44 are in spaced parallel relationship to one another, the exterior side being wider than the interior side. Inner side 38 is in perpendicular relationship to interior side 42 and exterior side 44. Outer side 40 diverges inwardly towards inner side 38 from exterior side 44 to interior side 42. One edge of outer side 40 is flush with one edge of interior side 42. The other edge of outer side 40 extends beyond one edge of exterior side 44 and terminates in flange 46 which includes a shoulder 47 and an arm 49. Shoulder 47 is parallel to inner side 38 and arm 49 is parallel to exterior side 44. A mortise 51, which is formed at a medial portion of arm 49 at the interior side thereof, is configured to receive a weather strip (not shown). Flange 46, which overlaps side jamb 26 when door 10 is closed, provides security and weather protection. The other edges of interior side 42 and exterior side 44 extend beyond the edges of inner side 38 to form a mortise 48. As shown at 53, the the inner faces of exterior side 44 and interior side 42 are thickened for support at the union of inner side 38 and exterior side 44, at the union of inner side 38 and interior side 42, and at the union of outer side 40 and exterior side 44.

Figure 16:
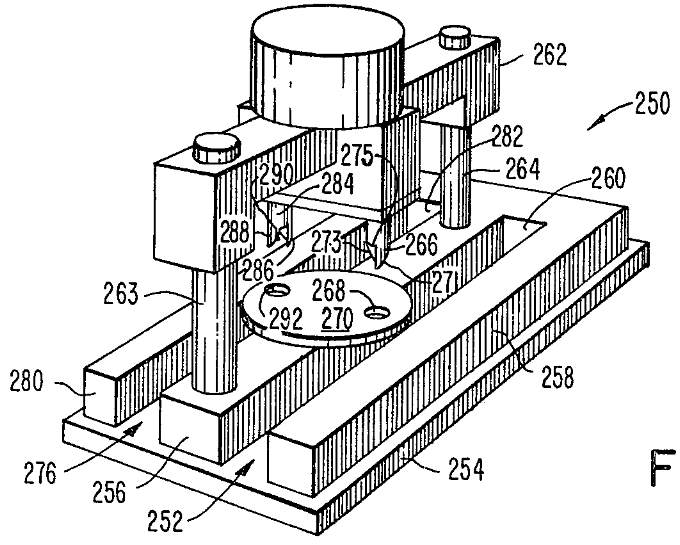
FIG. 16 is a perspective view of a press for punching holes for a key cylinder.
Figure 17A:
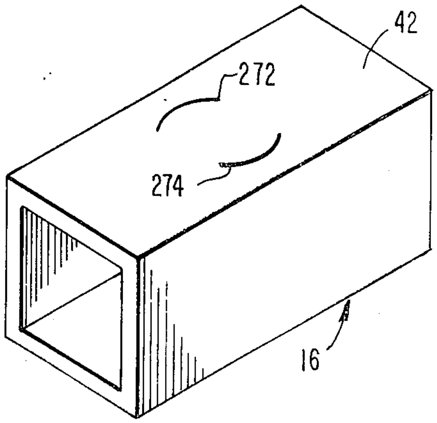
FIGS. 17A and 17B illustrate the steps in punching the holes of FIG. 16.
Figure 17B:
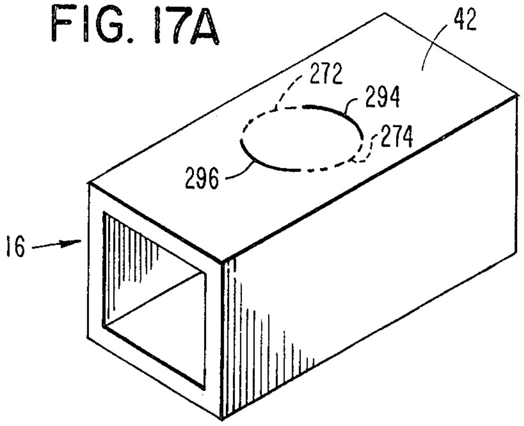

As shown in FIG. 2, lead edge stile 16 is provided with aligned holes 240, 242 and a rectangular aperture 244. A lock cylinder 246 is received in holes 240, 242 and a lock mechanism 248 is mounted within aperture 244. Referring to FIG. 16, it will be seen that each hole 240 and 242 is punched out in a press 250 in two steps. First, lead edge stile 16 is inserted into a guideway 252 formed between a bed 254 and blocks 256, 258 until it strikes a stop 260. Next, a head 262 of press 250 is actuated for downward movement towards side 42 of lead edge stile 16 on guides 263 and 264. Press 250 is provided with a bifurcated punch 266 that is mounted to head 262 in axial alignment with a guide hole 268 in a plate 270. Bifurcated punch 266 has a pair of curved blades 271, 273 that extend from a tip at the working end of the punch upwardly to a longitudinal slot 275. As head 262 travels downwardly, punch 266 passes through guide hole 268 and engages side 42 of lead edge stile 16. As head 262 continues its downward movement, a pair of crescent shaped slots 272, 274 are formed on side 42 of lead edge stile 16 as shown in FIG. 17A. Next, head 262 returns to its uppermost position. Next, lead edge stile is removed from guideway 252, rotated 180° about its longitudinal axis and inserted into guideway 252 until stop 260 is engaged by the end of lead edge stile 16. That is, lead edge stile 16 is positioned in guideway 252 in such a manner that side 44 of the stile is adjacent punch 266. Next, press 250 is actuated and a pair of crescent shaped slots are formed on side 44 of lead edge stile 16 opposite slots 272, 274. Next, head 262 returns to its uppermost position. Next, lead edge stile 16 is removed from guideway 252 and inserted into a guideway 276 formed between bed 254 and blocks 256, 280 until it strikes a stop 282. At this point, the area between slots 272 and 274 is aligned to be engaged by a bifurcated punch 284 that is mounted to head 262. Bifurcated punch 284 includes a pair of curved blades 286 and 288, each of which has a narrowed working end that curves upwardly towards a longitudinal slot 290. Next, press 250 is actuated and punch 284 passes through a guide hole 292 in plate 270. As punch 284 continues its downward travel, blades 286 and 288 engage side 42 of lead edge stile 16 about slots 272, 274 and punch out a pair of crescent shaped slots 294, 296 (FIG. 17B) that extend between slots 272, 274. In consequence, a circular hole 240 is punched out in side 42 of lead edge stile 16. Next, head 262 returns to its uppermost position. Next, lead edge stile 16 is removed from guideway 276, rotated 180° about its longitudinal axis and reinserted into guideway 276. Next, press 250 is actuated, a pair of crescent shaped slots are punched in a side 44 of lead edge stile 16 and hole 242 is formed. Then, head 262 returns to its uppermost position. Finally lead edge stile 16 is removed from press 250.

Figure 18:
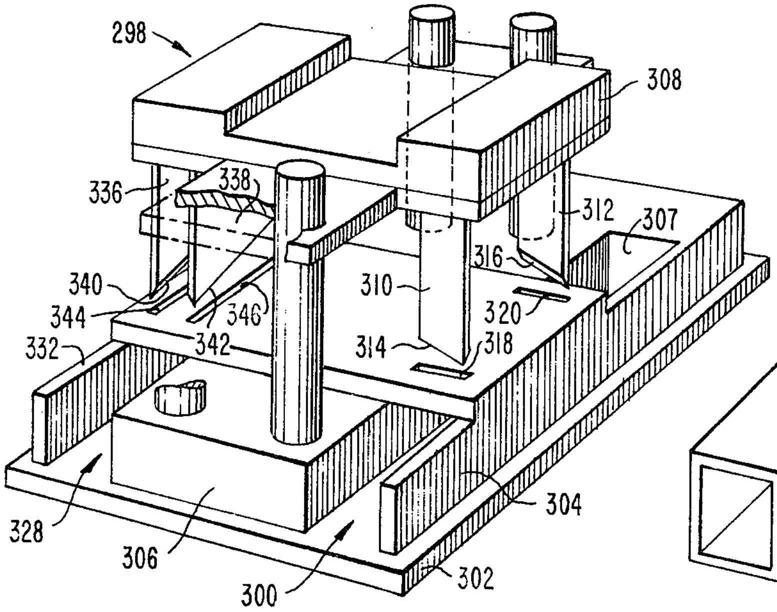
FIG. 18 is a perspective view of a press for punching an aperture for a lock mechanism.
Figure 19B:
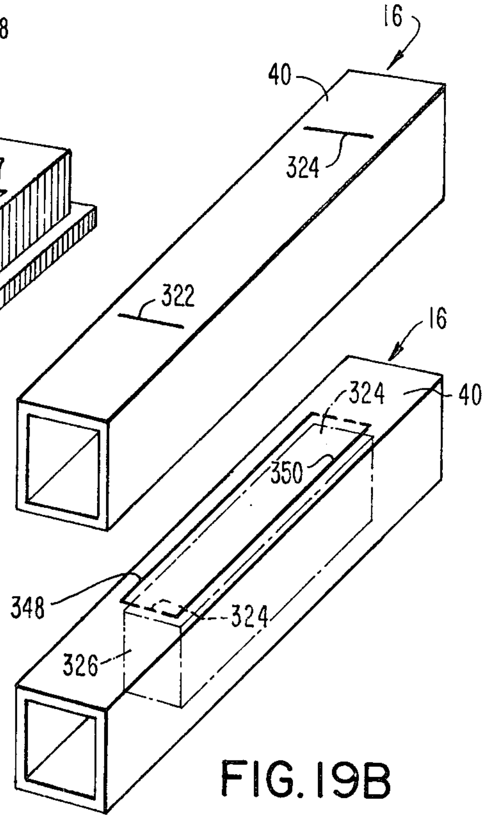

Rectangular aperture 244 is formed in a press 298 shown in FIG. 18. First, lead edge stile 16 is inserted into a guideway 300 formed between a bed 302 and blocks 304, 306 until it strikes a stop 307. Next, a head 308 of press 298 is actuated for downward movement towards side 40 of lead edge stile 16. A pair of punches 310 and 312 having substantially chisel shaped working ends 314 and 316, respectively, are mounted to head 308. Punches 310 and 312 lie along a plane that is in spaced parallel relationship with a longitudinal axis of guideway 300, the working ends being perpendicular to the longitudinal axis of guideway 300. As head 308 travels downwardly, punches 310 and 312 pass through guide slots 318 and 320, respectively and engage side 40 of lead edge stile 16. As head 308 continues its downward movement, a pair of linear slots 322 and 324 (FIG. 19A) that are in spaced parallel relationship to one another are punched in side 40 of lead edge stile 16, slots 322 and 324 being perpendicular to a longitudinal axis of lead edge stile 16. Next, head 308 returns to its uppermost position. Next, lead edge stile 16 is removed from guideway 300. A brace 326 is inserted into lead edge stile 16, brace 326 being loosely received therein and extending between slots 322 and 324. Next, lead edge stile 16 is inserted into a guideway 328 formed between bed 302 and blocks 306 and 332 until it strikes a stop. At this point, the area between slots 322 and 324 is aligned to be engaged by punches 336 and 338 having flat working ends 340 and 342, respectively. Punches 336 and 338, which extend the distance between slots 322 and 324, are in spaced parallel relationship to a longitudinal axis of guideway 328. As head 308 travels downwardly, punches 336 and 338 pass through guide slots 344 and 346, respectively and engage lead edge stile 16 between slots 322 and 324. As head 308 continues its downward movement, a pair of linear slots 348 and 350 are punched out (FIG. 19B), working ends 340 and 342 straddling brace 326 as punches 336 and 338 push through the lead edge stile. In consequence, rectangular aperture 244 is formed in side 40 of lead edge sitle 16. Then, head 308 returns to its uppermost position. Finally, lead edge stile 16 is removed from guideway 338 and brace 326 is taken out of the lead edge stile.

Figure 4:
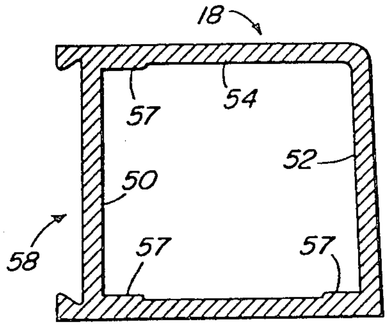
FIG. 4 is a sectional view of the hinge stile taken along the lines 4—4 of FIG. 2.

Referring now to FIG. 4, it will be seen that hinge stile 18 has a substantially trapezoidal profile in right cross section and includes an inner side 50, an outer side 52, an interior side 54 and an exterior side 56. Interior and exterior sides 54 and 56 are parallel to one another and are perpendicular to inner side 50. One edge of interior side 54 extends beyond one edge of inner side 50 and one edge of exterior side 56 extends beyond the other edge of inner side 50 to form a mortise 58. The other edges of interior side 54 and exterior side 56 are flush with opposite edges of outer side 52. The width of exterior side 56 is greater than the width of interior side 54, inner side 52 lying in a plane that diverges inwardly from exterior side 56 towards interior side 54. The inner faces of exterior side 56 and interior side 54 are thickened at 57 for support at the union of exterior side 56, inner side 50 and outer side 52, and at the union of interior side 54 and inner side 50.

Figure 20:
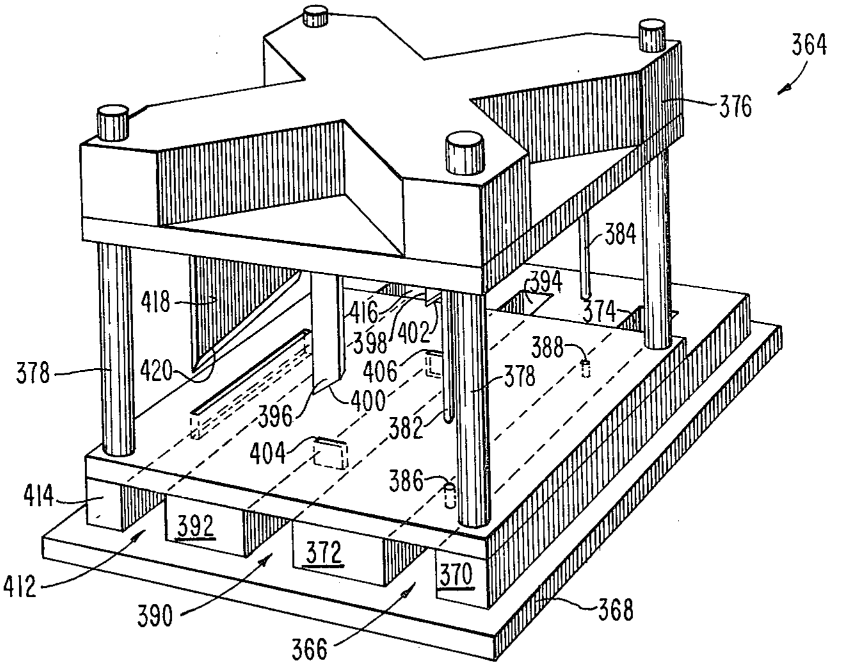
FIGS. 20 and 21 are perspective views of punching apertures in the hinge stile for hinge hardware.
Figure 22A:
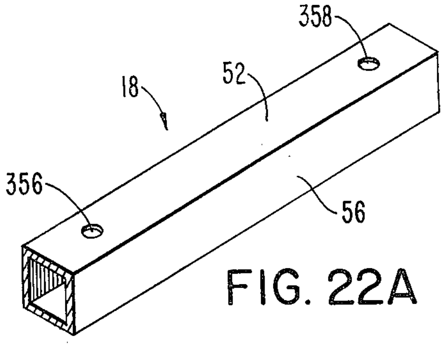
FIGS. 22A, 22B, 22C and 22D illustrate the steps in punching the aperture of FIGS. 20 and 21.
Figure 21:
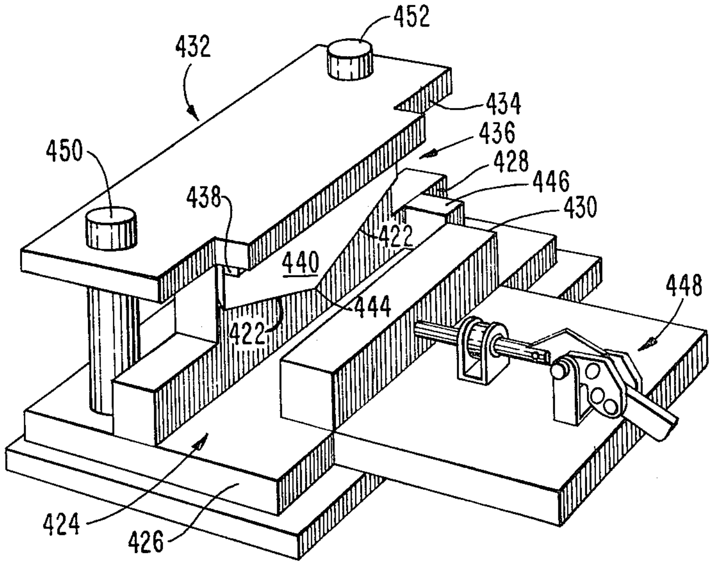
Figure 22B:
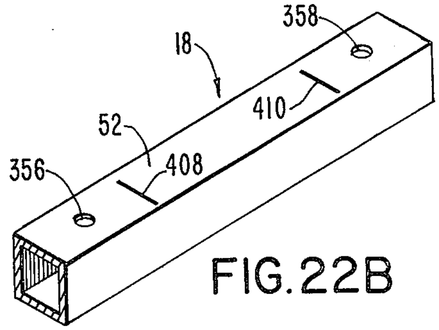
Figure 22D:
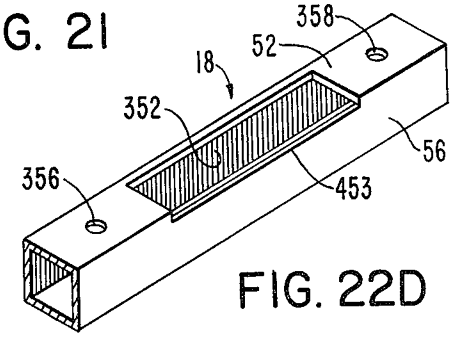
Figure 22C:
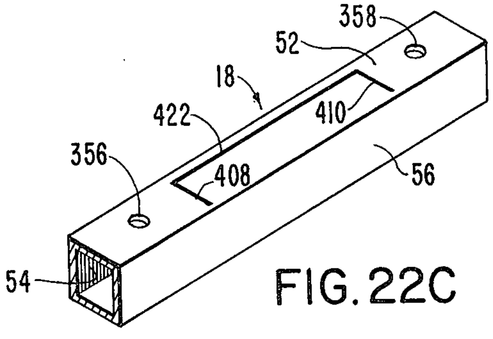

As shown in FIG. 2, hinge stile 18 is provided with substantially rectangular openings 352 and 354 that are punched out on side 52 and extend to side 54, each opening being configured to receive one leaf of hinges 14. Hinge stile 18 is formed also with punched holes 356 and 358 adjacent opposite ends of opening 352 and punched holes 360 and 362 adjacent opposite ends of opening 354. Referring now to FIG. 20, it will be seen that holes 356 and 358 are punched in a one step operation and opening 352 is punched in a three step operation, the holes and part of the opening being punched on a press 364. First, hinge stile 18 is inserted into a guideway 366 formed between a bed 368 and blocks 370, 372 until it strikes a stop 374. Next, a head 376 of press 364 is actuated for downward movement towards side 52 of hinge stile 18 on guide 378. Press 364 is provided with a pair of punches 382, 384 having at their working ends a circular profile in right cross section, the punches being spaced apart and lie along a plane that is parallel to a longitudinal axis of guideway 366. As head 376 travels downwardly, punches 382 and 384 pass through annular guide holes 386 and 388, respectively and engage side 52 of hinge stile 18. As head 376 continues its downward movement, holes 356 and 358 are punched on side 52 as shown in FIG. 22A. Next, head 376 returns to its uppermost position. Next, hinge stile 18 is removed from guideway 366 and is inserted into a guideway 390 formed between bed 368 and blocks 372 and 392 until it stirkes a stop 394. Next, head 376 is actuated for downward movement towards side 52 of hinge stile 18. Press 364 is provided also with a pair of punches 396 and 398 having beveled chisel and shaped working ends 400 and 402, respectively. Punches 396 and 398 lie along a plane that is parallel to guideway 390, working ends 400 and 402 being perpendicular to guideway 390. As head 376 moves downwardly, punches 396 and 398 pass through guide slots 404 and 406, respectively and engage side 52 of hinge stile 18. As head 376 continues its downward movement, a pair of linear slots 408 and 410 that are in spaced parallel relationship to one another are punched in side 52 of hinge stile 18, slots 408 and 410 being perpendicular to a longitudinal axis of the hinge stile. As shown in FIG. 22B, slots 408 and 410 extend from the corner formed between sides 52 and 56 inwardly of side 52. Next, head 376 returns to its uppermost position. Next, hinge stile is removed from guideway 390 and is inserted into a guideway 412 that is formed between bed 368 and blocks 393 and 414 until it strikes a stop 416. Next, press 364 is actuated for downward movement towards side 52 of hinge stile 18. Press 364 is provided also with a punch 418, having a beveled chisel shaped working head 420 which is in spaced parallel relationship to a longitudinal axis of guideway 412. The length of working head 420 is equal to the perpendicular distance between slots 408 and 410. As head 376 continues its downward movement, a linear slot 422 is punched in a side 52 adjacent and parallel to the corner formed between sides 52 and 54 of hinge stile 18 as shown in FIG. 22C. Slot 422 extends between slots 408 and 410. Next, head 376 returns to its uppermost position and hinge stile 18 is removed from guideway 412. Next, hinge stile 18 is inserted into a guideway 424 formed between a bed 426 and blocks 428, 430 of a press 432 having a head 434 (FIG. 21). An L-shaped punch 436 having a flange 438 and a working end 440 is mounted to head 434. Working end 440 has a cutting surface 442 that extends downwardly from each side of punch 436 and terminates in a tip 444 at the lowermost portion of working end 440. Flange 438 is disposed in a horizontal plane that is perpendicular to the travel path of head 434 and working end 440 is disposed in a vertical plane that is parallel to the travel path of head 434. Hinge stile 18 is inserted into guideway 424 until it strikes a stop 446, side 56 being below tip 444 and parallel to flange 438. A clamp 448 holds hinge stile 18 in a fixed position. Next, head 434 is actuated and moves downwardly on guides 450 and 452 towards hinge stile 18. Working end 440 of punch 436 engages side 56 and punches a linear slot 453 that extends between slot 408 and 410. In consequence, rectangular opening 352 is punched in hinge stile 18. Then, head 434 returns to its uppermost position. Finally, clamp 488 is loosened and hinge stile 18 is removed from guideway 424. In a similar manner, punched holes 356, 358 and rectangular opening 354 are punched in the other end of hinge stile 18 for accomodating another hinge 14.

Figure 5:
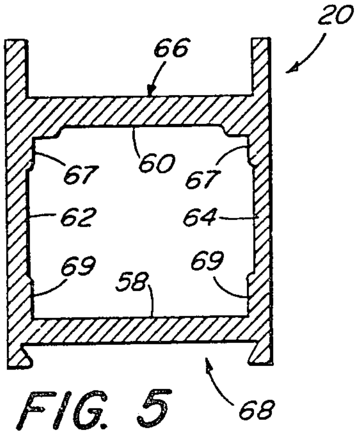
FIG. 5 is a sectional view of the top rail taken along the lines 5—5 of FIG. 2.

As shown in FIG. 5, top rail 20 has a substantially double I beam profile in right cross section and includes an inner side 58, an outer side 60, an interior side 62 and an exterior side 64. Inner side 58 and outer side 60 are parallel to one another and perpendicular to interior side 62 and exterior side 64. One edge of interior side 62 and one edge of exterior side 64 extend beyond the edges of outer side 60 to form a shallow, substantially U-shaped channel 66. The other edge of interior side 62 and the other edge of exterior side 64 extend beyond the edges of inner side 58 to form a mortise 68. As shown at 67, the inside corners formed at the union of outer side 60, interior side 62, and exterior side 64 are thickened for support. In addition, as shown at 69, the inner faces of interior side 62 and exterior side 64 are thickened for support at the union of inner side 58, interior side 62 and exterior side 64.

Figure 6:
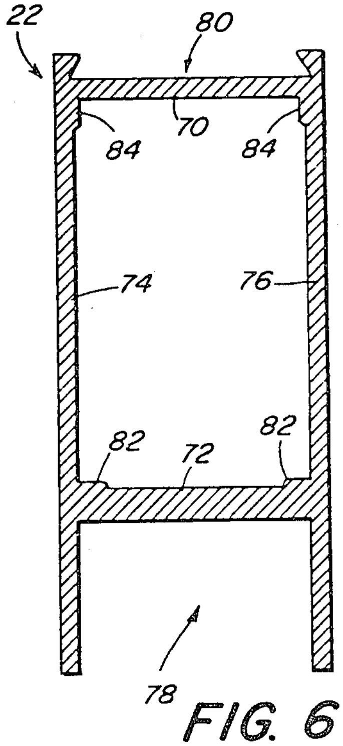
FIG. 6 is a sectional view of the bottom rail taken along the lines 6—6 of FIG. 2.

Referring now to FIG. 6, it will be seen that bottom rail 22 has a substantially A-shaped profile in right cross section and includes an inner side 70, an outer side 72, an interior side 74 and an exterior side 76. Inner side 70 and outer side 72 are parallel to one another and perpendicular to interior side 74 and exterior side 76. One edge of interior side 74 and one edge of exterior side 76 extend beyond the edges of outer side 72 to form a deep, substantially U-shaped channel 78. The other edge of interior side 74 and the other edge of exterior side 76 extend beyond the edges of inner side 70 to form a mortise 80. The inner faces of outer side 72 are thickened for support at 82, the union of outer side 72, interior side 74 and exterior side 76. Also, the inner faces of interior side 74 and exterior side 76 are thickened for support at 84, the union of inner side 70, interior side 74 and exterior side 76.

As previously indicated, lead edge stile 16, hinge stile 18, top rail 20 and bottom rail 22 are interconnected to form a rectangular frame by means of tie rods 86 and 88. The upper margin and the lower margin of inner side 48 of lead edge stile 48 are formed with holes 90 and 92, respectively. The upper margin and the lower margin of inner side 50 of hinge stile 18 are formed with holes 94 and 96, respectively. Holes 90 and 92 are in registration with holes 94 and 96, respectively. Registered holes 90 and 94 are configured to receive tie rod 86, for example a threaded rod and registered holes 92 and 96 are configured to receive tie rod 88, for example a threaded rod. Top rail 20 rests on a pair of brackets 98 and 100 which are fastened to the upper margins of lead edge stile 18 and hinge stile 20. Bracket 98 is formed with a through hole 102 which is in registration with hole 90 and bracket 100 is formed with a through hole 104 which is in registration with hole 94. Bracket 98 is positioned within mortise 48 and the edges of mortise 48 are crimped to secure bracket 98 thereto. In a similar manner, bracket 100 is crimped within mortise 58, hole 104 being being in registration with hole 94. Bottom rail 22 rests on a pair of brackets 106 and 108 which are fastened to the lower margins of lead edge stile 18 and hinge stile 20. Bracket 106 is formed with a through hole 110 which is in registration with hole 92 and bracket 100 is formed with a through hole 112 which is in registration with hole 94. Brackets 106 and 108 are crimped within mortises 48 and 58 in the manner hereinbefore described in connection with bracket 98.

Figure 7:
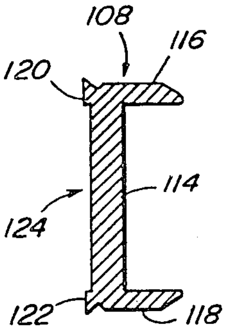
FIG. 7 is a sectional view of the bracket taken along the lines 7—7 of FIG. 2.

As shown in FIG. 7, bracket 108 is an extruded section having a C-shaped profile in right cross section and includes a base 114 and a pair of parallel legs 116, 118 that extend outwardly from one side of base 114 in perpendicular relationship thereto. The free ends of legs 116 and 118 are beveled inwardly. The other side of base 114 is provided with a pair of ribs 120 and 122 that define a flaring tenon 124 which is adapted to be snugly received within mortise 58. Brackets 98, 104 and 106 are identical in construction to bracket 98.

After the tenons of brackets 106 and 108 are inserted into their respective mortises to form a dovetail joint and are crimped therein, tie rod 88 is passed through bottom rail 22. Next, one end of tie rod 88 is passed through holes 112 and 96 into the interior of hinge stile 18. Next, bottom rail 22 is pressed into bracket 108 with legs 116 and 118 contacting the inner faces of interior and exterior sides 74 and 76 to prevent rotational movement of the bottom rail, the beveled ends of the legs facilitating reception of the bottom rail. Next, a rectangular washer 126, composed of steel for example, formed with a central hole 128 is placed on tie rod 88. Finally, a lock nut 130 is threaded onto tie rod 88. In a like fashion, the other end of bottom rail 18 is secured to lead edge stile 16. Top rail 20 is mounted to hinge stile 18 and lead edge stile 16 in a similar manner.

Figure 8:
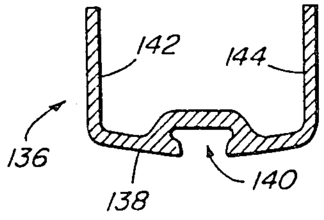
FIG. 8 is a sectional view of the adjustable expander taken along the lines 8—8 of FIG. 2.

As shown in FIG. 2, the bottom margins of lead edge stile 16 and hinge stile 18 are formed with substantially rectangular openings 132 and 134, respectively, which dimensionally correspond to and are in registration with channel 78. An adjustable leaf 136 is snugly received within channel 78 and openings 132, 134. Referring to FIG. 8, adjustable leaf 136 has a substantially U-shaped profile in right cross sections and includes a base 138 which is formed with a mortise 140 and a pair of upright legs 142, 144. Mortise 140 is configured to receive a weather strip (not shown). Legs 142 and 144 press against the inner faces of interior side 74 and exterior side 76 of bottom rail 22 in such a manner that leaf 136 is constrained against free movement within channel 78 and is constrained for forced movement within channel 78.

Figure 23:
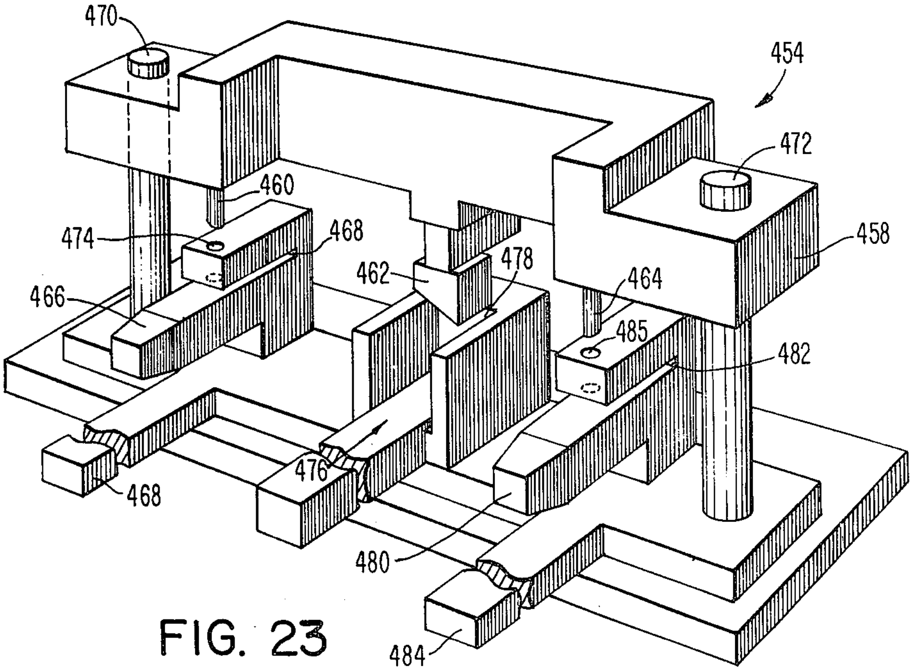
FIG. 23 is a perspective view of a press for punching holes and notches in the lead edge stile and hing stile.
Figure 25:
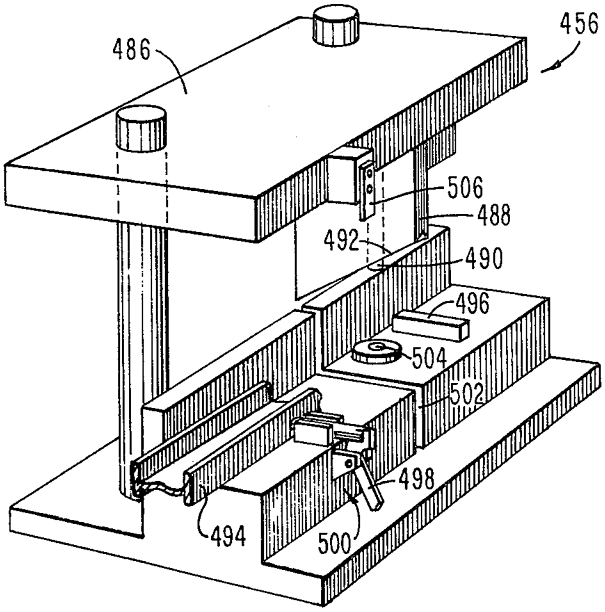
FIG. 25 is a perspective view of a press for punching brackets.
Figure 24A:
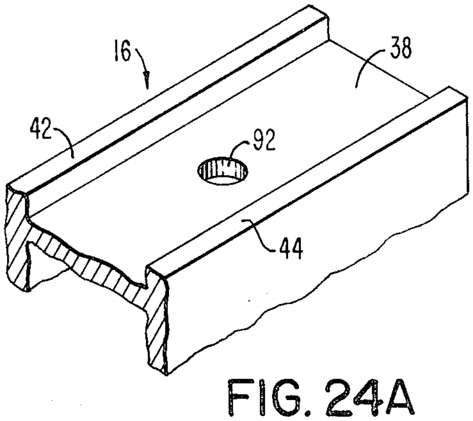
FIGS. 24A and 24B illustrate the steps in punching the holes and openings of FIG. 23.

In accordance with the teachings of the present invention, holes 90, 92, 94 and 96 as well as rectangular openings 132 and 134 are punched in a press 454 as shown in FIG. 23. Brackets 102, 104, 106 and 108 are cut to a predetermined length in a press 456 which also punches holes 102, 104, 110 and 112 as shown in FIG. 25. Referring now to FIG. 23, it will be seen that press 454 includes a head 458 to which punches 460, 462 and 464 are mounted. Each punch 460 and 464 is provided with a beveled working end having a circular profile in right cross section. Punch 462 is provided with a beveled working end having a rectangular profile in right cross section. Punch 460 is used for punching holes 92 and 96; punch 462 is utilized for punching openings 132 and 134; and punch 464 is used for punching holes 90 and 92. The following discussion relates to punching holes 90, 92 and opening 132 in lead edge stile 16. It is to be understood that holes 94, 96 and opening 134 are punched in hinge stile 18 in a similar manner. First, the bottom end of lead edge stile 16 is placed on a track 466 and is pushed towards punch 460 until it strikes a stop 468. Side 38 of lead edge stile 16 is facing punch 460 and sides 42, 44 are straddling track 466. A foot 468 extends outwardly from press 454 in spaced parallel alignment with track 466 for supporting lead edge stile 16. Next, press 454 is actuated and head 458 moves downwardly on a pair of guides 470, 472. As head 458 continues its downward movement, punch 460 passes through a guide 474 and engages side 38. Next, beveled punch 460 pushes through side 38 and forms hole 92, as shown in FIG. 24A. Then, head 458 returns to its uppermost position. Finally, lead edge stile 16 is removed from track 466.

Figure 24B:
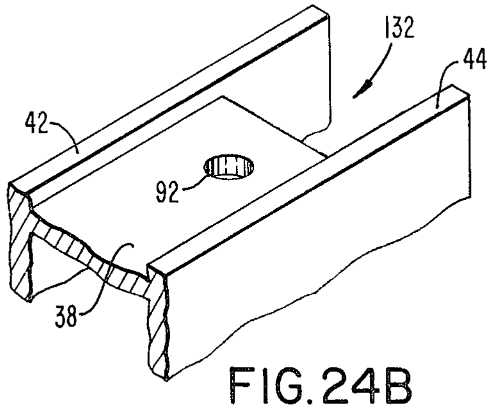

The bottom end of lead edge stile 16 is inserted in a U-shaped channel 476 until it strikes a stop 478, side 38 facing punch 462. Next, press 454 is actuated and head 458 moves downwardly. As head 458 continues its downward movement, the lead edge of beveled punch 462 passes between extending sides 42, 44 and engages side 38. Next, punch 462 pushes through side 38 and forms rectangular opening 132, as shown in FIG. 24B. It is to be noted that punch 462 is centered in U-shaped channel 476, the channel being wider than the punch so that the punch does not strike extending sides 42 and 44.

Finally, head 458 returns to its upper most position and lead edge stile 16 is removed from channel 476.

The top end of lead edge stile 16 is placed on a track 480 and pushed towards punch 464 until it strikes a stop 482. Side 38 of lead edge stile 16 is facing punch 464 and sides 42, 44 are straddling track 480. A foot 484 extends outwardly from press 454 in spaced parallel alignment with track 480 for supporting lead edge stile 16. Next, press 454 is actuated, head 458 moves downwardly and punch 464 passes through a guide 485. As head 458 continues its downward movement, punch 464 pushes through side 38 and forms hole 90. Then, head 458 returns to its uppermost position. Finally, lead edge stile 16 is removed from track 480. As previously indicated, the foregoing steps are repeated for punching holes 94, 96 and opening 134 in hinge stile 18.

Referring now to FIG. 25, it will be seen that press 456 includes a head 486 having a shearing blade 488 and a punch 490. Shearing blade 488 has a V-shaped notched working end 492 that is beveled and punch 490 has a circular profile in right cross section. First, an endless length of an extruded member 494 having a cross section that corresponds to that of bracket 108 is inserted into press 456 until it strikes a stop 496. Next, a lever arm 498 of a clamp 500 is lifted up for holding member 494. Next, press 456 is actuated and head 486 moves downwardly until the V-shaped notched cutting edge of blade 488 and the leading end of punch 490 engages member 494. As head 486 continues its downward movement, blade 488 severs member 494 and punch 490 punches a hole in member 494, blade 488 and punch 490 being guided in a slot 502 and guide hole 504, respectively. Head 486 is provided with a finger 506 which engages lever 498 and releases clamp 500 after the cutting and punching operation. Then head 486 returns to its uppermost position. Finally, the severed section, which is bracket 108, is removed from press 456. Bracket 110 is identical to bracket 108 and is fabricated in an identical manner. Brackets 98 and 100, which are slightly smaller in length than brackets 108 and 110 are made using similar steps, stop 496 being adjusted for the smaller length.

Figure 10:
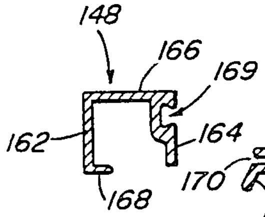
FIG. 10 is a sectional view of the other section of the glazing bead taken along the lines 10—10 of FIG. 2.
Figure 9:
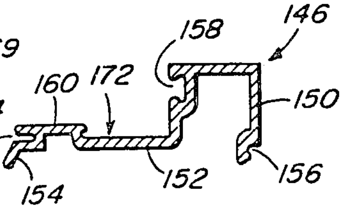
FIG. 9 is a sectional view of one section of the glazing bead taken along the lines 9—9 of FIG. 2.

Glass panel 24 is captively held to door 10 by means of a pair of interlocking glazing beads 146, 148 that are snap-fitted into mortises 48, 58, 68 and 80. The details of glazing beads 146 and 148 are shown in FIGS. 9 and 10, respectively. Glazing bead 146 includes a body 150 having a substantially rectangular profile in right cross section and an extension member 152 which terminates in a tab 154. The lower portion of body 150 at the right hand side thereof as viewed in FIG. 9 is provided with a lock 156. Tab 154 and lock 156 are operative to hold glazing bead 146 to mortises 48, 58, 68 and 80. The left hand side of body 150 is formed with a mortise 158. Extension member 152 includes a strip 160 which constitutes a lock for glazing bead 148. As shown in FIG. 19, glazing bead 148 has a substantially rectangular profile in right cross section and includes a pair of upright members 162, 164, a connecting cross piece 166 and a tab 168. Upright member 164 is formed with a mortise 169 at an edge adjacent cross piece 166. Tab 168 extends from the lower edge of upright 162 towards the lower edge of upright 164 in parallel relationship to cross piece 166. Glazing bead 148 is captively held to glazing bead 146 by inserting tab 168 into an opening 170 formed between strip 160 and tab 154, the inner faces of uprights 162, 164 being in contact with the outer edges of strip 160.

Figure 11:
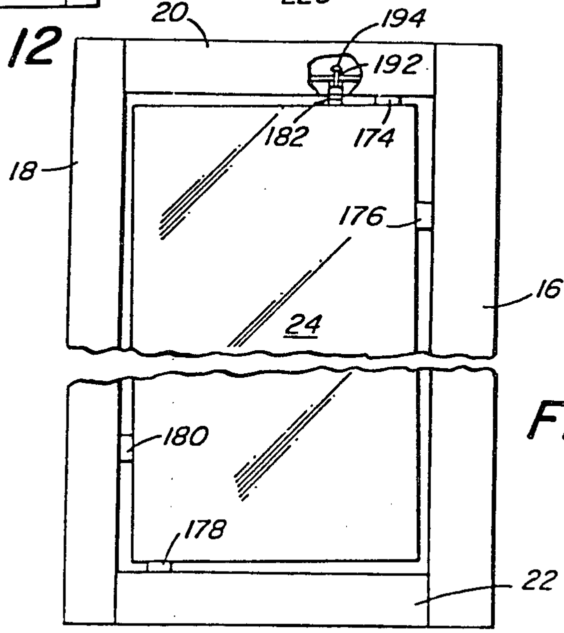
FIG. 11 is a front elevation of the entrance door of FIG. 1 with certain parts removed to show the lead edge stile and hinge stile adjustment.

In fabrication of entrance door 10, after lead edge stile 16, hinge stile 18, top rail 20 and bottom rail 22 are interconnected to form a rigid frame, glazing bead 146 sections are snapped into mortises 48, 58, 68 and 80, body 150 being on the exterior side of the door. Suitable packing (not shown) is placed in mortise 158. Glass panel 24 is inserted in a channel 172 formed in extension 152 between body 150 and strip 160. As viewed in FIG. 11, rubber shims 174, 176 and rubber shims 178, 180 are positioned adjacent the edges of glass panel 24 at the upper right hand corner and lower left hand corner or door 10, respectively. That is, shims 174 and 176 are positioned at the corner formed by top rail 20 and lead edge stile 16, shim 174 being closer to the corner than shim 176. Shims 178 and 180 are positioned at the corner formed by bottom rail 22 and hinge stile 18, shim 178 being closer to the corner than shim 180. The arrangement of shims is such that glass panel 24 is mounted obliquely with respect to the assemblage of lead edge stile 16, hinge stile 18, top rail 20 and bottom rail 22, the assemblage and panel being disposed in a common plane. The face of glass panel 24 is parallel to the faces of exterior sides 44, 56, 64 and 76, and is oblique with respect to the faces of inner sides 38, 50, 58 and 70. As viewed in FIG. 11, from the exterior side of door 10, glass panel 24 is tilted counterclockwise within the rectangular opening defined by the interconnected extruded sections of door 10, the edges of glass panel within channel 172. An adjusting lever or block 182, composed of a plastic such as a polyamide resin, rests on the upper edge of glass panel 24 adjacent shim 174. Adjusting block 182 has a step profile in right cross section and includes treads 184, 186 and riser 188, 190. Riser 190 projects through an opening 192 formed in inner side 58 of top rail 20 into contact with the upper edge of glass panel 24. A mover 194, for example a screw, is threaded into a hole 196 formed in outer side 60 of top rail 20, screw 194 being in contact with tread 184. As screw 194 is turned into hole 196, riser 190 presses against the edge of glass panel 24 and pulls lead edge stile 16 upwardly with respect to hinge stile 18. After glass panel 24 is in position, glazing bead 148 is snapped into glazing bead 146, tab 168 being received in opening 170 and the inner edge of upright 164 pressing against the edge of strip 160 nearest body 150. A suitable packing (not shown) is positioned in mortise 169.

As best shown in FIG. 2, outer side 52 of hinge stile 18 is formed with a pair of substantially rectangular openings 352 and 354, each of which is configured to snugly receive one leaf of hinges 14, the exposed face of the hinges being flush with the exposed face of inner side 52. Each hinge 14 is mounted to a back plate 186 by means of screws and the back plates, which are larger than openings 352 and 354, are fastened to outer side 52 by means of screws. After door 10 is hung on frame 12, screw 194 is turned to compensate for any misalignment between the top edge of door 10 and frame 12. Strip 160 is adjusted to compensate for any misalignment between the bottom edge of door 10 frame 12.

Figure 12:
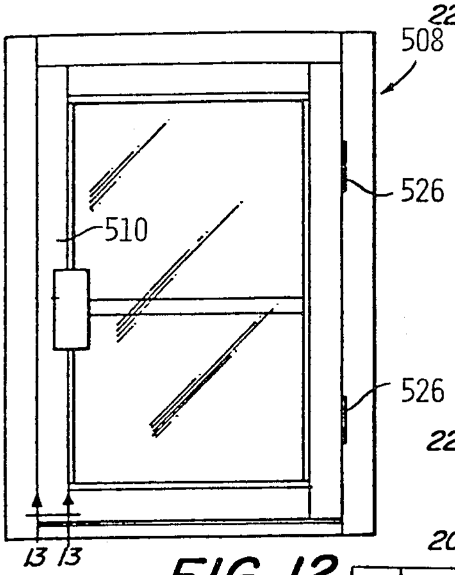
FIG. 12 is a front elevation of an alternative embodiment of the invention.
Figure 13:
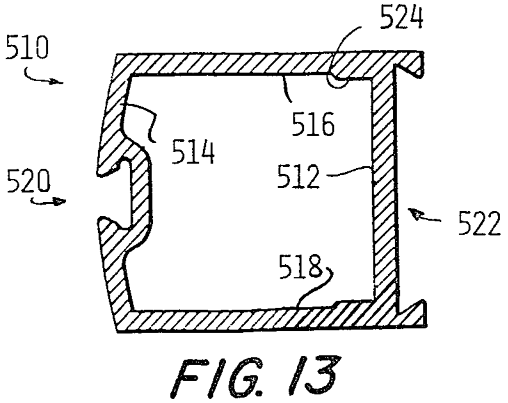
FIG. 13 is a sectional view of the lead edge stile taken along the lines 13—13 of FIG. 11.

An alternative embodiment of door 10 is shown in FIG. 12 at 508. The construction of door 508 is similar to door 10 and has like parts with the exception of flange 46. Door 508 includes an extruded lead edge stile 510 having a rectangular configuration as shown in FIG. 13. Lead edge stile 510 has an inner side 512, sn outer side 514, an interior side 516, and an exterior side 518. Outer side 514 is bowed outwardly and is formed with a mortise 520 at a medial portion thereof for a weather strip (not shown). Interior side 516 and exterior side 518 are parallel to one another and perpendicular to inner side 512. A mortise 522, which corresponds to mortise 48, is provided on the inner face of inner side 512. The inner faces of interior side 516 and exterior side 518 are thickened for support at 522, adjacent the union of inner side 512, interior side 516 and exterior side 518. In one embodiment, door 508 is provided with butt hinges 526 and swings either inwardly or outwardly. In an alternative embodiment, door 508 is hung on pivot pins of the type shown in FIG. 15 and swings both inwardly and outwardly.

Figure 14:
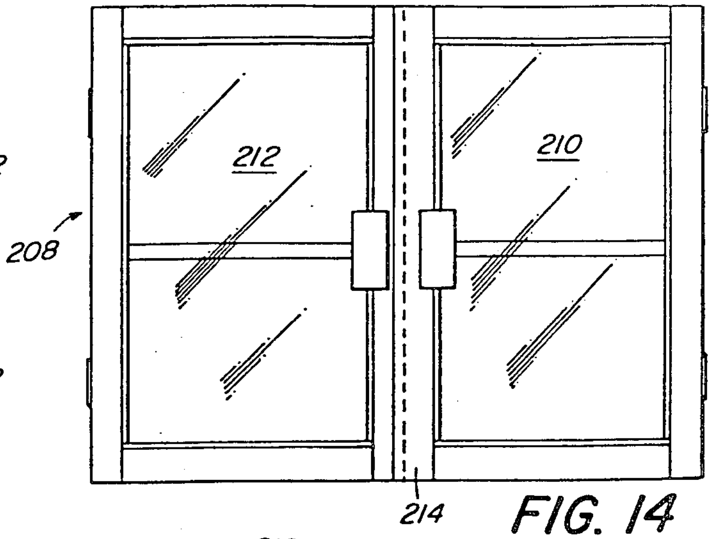
FIG. 14 is a front elevation of another embodiment of the invention.

In the embodiment of FIG. 14, there is shown a double door configuration 208 which swings outwardly and comprises a right hand door 210 and a left hand door 212. Right hand door 210 is similar to door 10 and left hand door 212 is similar to door 188. Right hand door 210 includes a flange 214 which corresponds to flange 46 and overlaps the lead edge stile of door 212 for security and weather protection.

Figure 15:
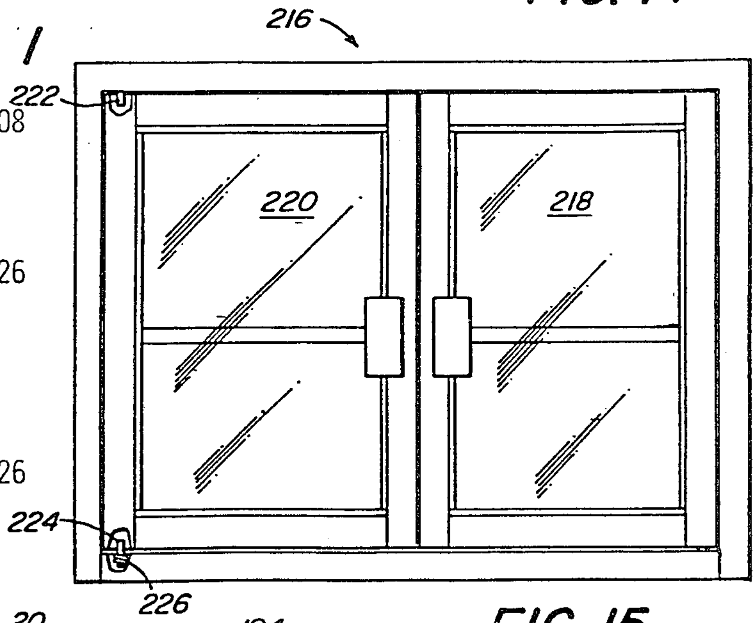
FIG. 15 is a front elevation of yet another embodiment of the invention.

FIG. 15 shows another embodiment in the form of a double door configuration 216 which swings inwardly and outwardly and comprises a right hand door 218 and a left hand door 220, each door being hung on a pair of pins 222 and 224. Pin 222 is fixed to a door frame 226 and pin 224 is spring loaded to door frame 226.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method of fabricating a door having a plurality of hollow extruded sections, said extruded sections including a lead edge stile, a hinge stile, a top rail and a bottom rail, each of said extruded sections having inner, outer, interior and exterior sides, said method comprising the steps of:

a. punching a pair of substantially rectangular openings in the outer side of said hinge stile, said rectangular openings spaced aprat and configured to receive a leaf of a hinge;

b. punching a pair of holes in the inner side of said hinge stile with a press having at least one track and at least one punch by inserting said hinge stile onto said track a specified distance until a preselected point on the inner side of said hinge stile is opposite said punch, actuating said press, moving said punch towards said preselected point and punching at least one of said holes in the inner side of said hinge stile, one of said holes adjacent one end of said hinge stile and the other of said holes adjacent the other end of said hinge stile;

c. punching a pair of holes in the inner side of said lead edge stile, one of said holes adjacent one end of said lead edge stile and the other of said holes adjacent the other end of said lead edge stile;

d. interconnecting said lead edge stile, said hinge stile, said bottom rail and said top rail to form a substantially rectangular frame.

2. The method as claimed in claim 1 wherein said interconnecting step includes:

a. fastening a first tie rod to said lead edge stile and said hinge stile, said top rail positioned between said lead edge stile and said hinge stile, said first tie rod disposed within said top rail and extending into the hollow portion of said lead edge stile through said one hole punched therein and into the hollow portion of said hinge stile through said one hole punched therein; and b. fastening a second tie rod to said lead edge stile and said hinge stile, said bottom rail positioned between said lead edge stile and said hinge stile, said second tie rod disposed within said bottom rail and extending into the hollow portion of said lead edge stile through said other hole punched therein and into the hollow portion of said hinge stile through said other hole punched therein.

3. The method as claimed in claim 1 wherein said step of punch a pair of substantially rectangular openings in the outer side of said hinge stile includes the steps of punching first and second parallel slots in the outer side of said hinge stile, punching a third slot which intersects adjacent ends of said first and second parallel slots and punching a fourth slot which intersects the other ends of said first and second parallel slots, said first, second, third and fourth slots defining one of said rectangular openings.

4. A method of fabricating a door having a plurality of hollow extruded sections, said extruded sections including a lead edge stile, a hinge stile, a top rail and a bottom rail, each of said extruded sections having inner, outer, interior and exterior sides, said method comprising the steps of:

a. punching a pair of substantially rectangular openings in the outer side of said hinge stile, each of said rectangular openings formed by punching a series of interconnected slots in the outer side of said hinge stile, said slots intersecting one another to form said rectangular opening, said rectangular openings spaced apart and configured to receive a leaf of a hinge;

b. punching a pair of holes in the inner side of said hinge stile, one of said holes adjacent one end of said hinge stile and the other of said holes adjacent the other end of said hinge stile;

c. punching a pair of holes in the inner side of said lead edge stile, one of said holes adjacent one end of said lead edge stile and the other of said holes adjacent the other end of said lead edge stile;

d. attaching a pair of brackets to said lead edge stile and a pair of brackets to said hinge stile, each said bracket formed with a hole, said hole in each said bracket aligned with one of said holes in said lead edge stile and one of said holes in said hinge stile; and e. interconnecting said lead edge stile, said hinge stile, said top rail and said bottom rail to form a substantially rectangular frame, said top rail supported on one of said pair of brackets attached to said lead edge stile and one of said pair of brackets attached to said hinge stile, said bottom rail supported on the other of said pair of brackets attached to said lead edge stile and the other of said pair of brackets attached to said hinge stile.

5. The method as claimed in claim 4 wherein said interconnecting step includes:

a. fastening first tie rod means to said lead edge stile and said hinge stile, said top rail positioned between said lead edge stile and said hinge stile, said first tie rod means disposed within the hollow portion of said top rail and extending through said brackets supporting said top rail into the hollow portions of said lead edge stile and said hinge stile; and b. fastening second tie rod means to said lead edge stile and said hinge stile, said bottom rail positioned between said lead edge stile and said hinge stile, said second tie rod means disposed within the hollow portion of said bottom rail and extending through said brackets supporting said bottom rail into the hollow portions of said lead edge stile and said hinge stile.

6. A method of fabricating a door having a plurality of hollow extruded sections, said extruded sections including a lead edge stile, a hinge stile, a top rail and a bottom rail, each of said extruded sections having inner, outer, interior and exterior sides, said method comprising the steps of:

a. punching a pair of substantially rectangular openings in the outer side of said hinge stile, said rectangular openings spaced apart and configured to receive a leaf of a hinge;

b. punching a pair of holes in the inner side of said hinge stile, one of said holes adjacent one end of said hinge stile and the other of said holes adjacent the other end of said hinge stile;

c. punching a pair of holes in the inner side of said lead edge stile, one of said holes adjacent one end of said lead edge stile and the other of said holes adjacent the other end of said lead edge stile; and d. interconnecting said lead edge stile, said hinge stile, said bottom rail and said top rail to form a substantially rectangular frame;

e. said step of punching said pair of holes in the inner side of said hinge stile including the steps of inserting one end of said hinge stile onto a first track of a press until it strikes a stop, said press having a first circular punch, the inner side of said hinge stile facing said first circular punch, actuating said press and moving said first circular punch towards the inner side of said hinge stile and punching said one hole in the inner side of said hinge stile at said one end, said first circular punch returning to its initial position, removing said hinge stile from said first track, inserting the other end of said hinge stile onto a second track of said press until it strikes a stop, said press having a second circular punch, the inner side of said hinge stile facing said second circular punch, actuating said press and moving said second circular punch towards the inner side of said hinge stile and punching said other hole in the inner side of said hinge stile at said othe end, said second circular punch returning to its initial position, and removing said hinge stile from said second track.

7. The method as claimed in claim 6 including the step of:

a. punching an opening in said hinge stile between said one hole and said one end of said hinge stile; and b. punching an opening in said lead edge stile between said one hole and said one end of said lead edge stile.

8. A method of fabricating a door having a plurality of hollow extruded sections, said extruded sections including a lead edge stile, a hinge stile, a top rail and a bottom rail, each of said extruded sections having inner, outer, interior and exterior sides, said method comprising the steps of:

a. punching a pair of substantially rectangular openings in the outer side of said hinge stile, said rectangular openings spaced apart and configured to receive a leaf of a hinge;

b. punching a pair of holes in the inner side of said hinge stile, one of said holes adjacent one end of said hinge stile and the other of said holes adjacent the other end of said hinge stile;

c. punching a pair of holes in the inner side of said lead edge stile, one of said holes adjacent one end of said lead edge stile and the other of said holes adjacent the other end of said lead edge stile;

d. attaching a pair of brackets to said lead edge stile and a pair of brackets to said hinge stile, each said bracket formed with a hole, said hole in each said bracket aligned with one of said holes in said lead edge stile and one of said holes in said hinge stile; and e. interconnecting said lead edge stile, said hinge stile, said top rail and said bottom rail to form a substantially rectangular frame, said top rail supported on one of said pair of brackets attached to said lead edge stile and one of said pair of brackets attached to said hinge stile, said bottom rail supported on the other of said pair of brackets attached to said lead edge stile and the other of said pair of brackets attached to said hinge stile;

f. said interconnecting step including the steps of fastening first tie rod means to said lead edge stile and said hinge stile, said top rail positioned between said lead edge stile and said hinge stile, said first tie rod means disposed within the hollow portion of said top rail and extending through said brackets supporting said top rail into the hollow portions of said lead edge stile and said hinge stile, and fastening second tie rod means to said lead edge stile and said hinge stile, said bottom rail positioned between said lead edge stile and said hinge stile, said second tie rod means disposed within the hollow portion of said bottom rail and extending through said brackets supporting said bottom rail into the hollow portions of said lead edge stile and said hinge stile;

g. said step of punching a pair of substantially rectangular openings in said hinge stile including the steps of inserting one end of said hinge stile into a first guideway formed in a press until it strikes a stop, said press including a pair of punches that are spaced apart for punching a pair of slots in the outer side of said hinge stile, actuating said press for moving said punches towards said hinge stile and punching said slots, said slots being perpendicular to a longitudinal axis of said hinge stile, said punches returning to their initial position, removing said hinge stile from said first guideway, inserting said hinge stile into a second guideway until it strikes a stop, said press including a beveled punch for punching a first elongated slot in the outer side of said hinge stile between said pair of slots, actuating said press for moving said beveled punch towards said hinge stile and punching said first elongated slot, said first elongated slot extending between the ends of said pair of slots in spaced parallel relationship to the longitudinal axis of said hinge stile, said beveled punch returning to its initial position, removing said hinge stile from said second guideway, inserting said hinge stile into a third guideway of a press having an elongated punch for punching a second elongated slot between the other ends of said pair of slots, said second elongated slot parallel to said first elongated slot, moving said elongated punch towards said hinge stile and punching said second elongated slot, said pair of slots and said first and second elongated slots defining said rectangular opening, said elongated punch returning to its initial position, and removing said hinge stile from said third guideway.

9. The method as claimed in claim 8 including the steps of:

a. punching a pair of holes in said lead edge stile for receiving a lock cylinder, one of said holes punched in the interior side of said lead edge stile and the other of said holes punched in the exterior side of said lead edge stile, said one hole in said interior side of said lead edge stile in alignment with said other hole in said exterior side of said lead edge stile; and b. punching a rectangular opening in the outer side of said lead edge stile adjacent said pair of holes for receiving a lock mechanism.

10. The method as claimed in claim 9 wherein said step of punching said pair of holes in said lead edge stile for receiving a lock cylinder includes the steps of:

a. punching a first pair of crescent shaped slots in the interior side of said lead edge stile; and b. punching a second pair of crescent shaped slots in the interior side of said lead edge stile, said second pair of crescent shaped slots extending between the ends of said first pair of crescent shaped slots to form a hole having a circular profile.

11. A method of fabricating a door having a plurality of hollow extruded sections, said extruded sections including a lead edge stile, a hinge stile, a top rail and a bottom rail, each of said extruded sections having inner, outer, interior and exterior sides, said method comprising the steps of:

a. punching a pair of substantially rectangular openings in the outer side of said hinge stile, said rectangular openings spaced apart and configured to receive a leaf of a hinge;

b. punching a pair of holes in the inner side of said hinge stile, one of said holes adjacent one end of said hinge stile and the other of said holes adjacent the other end of said hinge stile;

c. punching a pair of holes in the inner side of said lead edge stile, one of said holes adjacent one end of said lead edge stile and the other of said holes adjacent the other end of said lead edge stile; and d. interconnecting said lead edge stile, said hinge stile, said bottom rail and said top rail to form a substantially rectangular frame;

e. said step of punching a pair of substantially rectangular openings in said hinge stile including the steps of inserting one end of said hinge stile into a first guideway formed in a press until it strikes a stop, said press including a pair of punches that are spaced apart for punching a pair of slots in the outer side of said hinge stile, actuating said press for moving said punches towards said hinge stile and punching said slots, said slots being perpendicular to a longitudinal axis of said hinge stile, said punches returning to their initial position, removing said hinge stile from said first guideway, inserting said hinge stile into a second guideway until it strikes a stop, said press including a beveled punch for punching a first elongated slot in the outer side of said hinge stile between said pair of slots, actuating said press for moving said beveled punch towards said hinge stile and punching said first elongated slot, said first elongated slot extending between the end of said pair of slots in spaced parallel relationship to the longitudinal axis of said hinge stile, said beveled punch returning to its initial position, removing said hinge stile from said second guideway, inserting said hinge stile into a third guideway of a press having an elongated punch for punching a second elongated slot between the other ends of said pair of slots, said second elongated slot parallel to said first elongated slot, moving said elongated punch towards said hinge stile and punching said second elongated slot, said pair of slots and said first and second elongated slots defining said rectangular opening, said elongated punch returning to its initial position, and removing said hing stile from said third guideway.

* * * * *